AUTOMATIC EQUALIZATION FOR MULTIPLE POLLED STATIONS

Filed Feb. 18, 1969 3 Sheets-Sheet 1

INVENTOR.
SANG Y. WHANG
EDWARD BLECKNER, JR.
BY
Jackson + Jones
ATTORNEYS.

AUTOMATIC EQUALIZATION FOR MULTIPLE POLLED STATIONS

AUTOMATIC EQUALIZATION FOR MULTIPLE POLLED STATIONS

Filed Feb. 18, 1969

United States Patent Office 3,566,271
Patented Feb. 23, 1971

3,566,271

AUTOMATIC EQUILIZATION FOR MULTIPLE POLLED STATIONS

Sang Y. Whang, Miami, and Edward Bleckner, Jr., Plantation, Fla., assignors to International Communications Corporation, Miami, Fla., a corporation of Florida Filed Feb. 18, 1969, Ser. No. 800,182
Int. Cl. H04b *1/10, 1/00*
U.S. Cl. 325—65 20 Claims

ABSTRACT OF THE DISCLOSURE

This invention relates in general to automatic equalization systems, and more particularly relates to a central processor which incorporates an automatic equalizing system capable of equalizing a receiver terminal at the central processor which is common to a large number of remote stations. The central processor includes a polling circuit for addressing any one of the remote stations, which remote stations each include an equalizer circuit for that remote station's receiving equipment. Each remote station's different geographical location presents different equalization requirements for error-free communication with the central processor, and a plurality of equalizing circuits are located at the central processor with one equalizer circuit being assigned to each remote station. Each equalizer is preadjusted during an equalizing test sequence for the remote station to which it is assigned. Thereafter, during normal data transmission operations, decoding equipment at the central processor location recognizes a polling address and decodes the identity of the polled remote station. Switching equipment responds to the decoder for automatically connecting the polled remote station's equalizer in the receive line prior to the time that a response from the polled remote station is due to be received at the central processor.

CROSS-REFERENCE TO RELATED APPLICATION

The present application is related to an equalizing circuit for modems as described and claimed in a patent application entitled, "Equalization Circuit" by Sang Y. Whang filed Mar. 1, 1968, having Ser. No. 709,608 and assigned to Milgo Electronic Corporation.

BACKGROUND OF THE INVENTION

(1) Field of the invention

Variable equalization enjoys a widespread use in communication links having widely different amplitude and delay characteristics. Typical examples include commercial, military and foreign unconditioned voice-grade telephone lines. More recently, computer centers capable of operating with a plurality of remote stations have presented new and complex communication uses for equalization systems.

(2) Description of the prior art

Variable equalization as known to the prior art is characterized as the custom upgrading of a communication line between a transmitter and a receiver. Such custom upgrading is normally accomplished by introducing into a transmission link, amplitude and delay devices which, when adjusted, vary the amplitude and delay characteristics of the line until these characteristics are relatively constant for the frequency band employed during transmission over the link.

In the past such adjustments were numerous, delicate, and involved adjustments over a broad band frequency spectrum. For example, standard telephone line spectrum broadband modems of the prior art employed more than a dozen amplitude and delay sections to obtain required adjustments. Such adjustments each employed oscilloscopes and/or other expensive and sophisticated testing equipment. Prior equalization for a single modem transmitter and receiver combination took over an hour with the use of separate communication networks and highly skilled operators. In the above mentioned copending application, a simple and significantly faster equalization method and apparatus is discussed for a narrow bandwidth modem, which faster equalization is of particular importance to the present application.

In those instances wherein a centralized receiver must be capable of communicating with a large number of remote transmitters, each of which is located at different points along the transmission network, different equalization criteria exist for each remote station. Such equalization criteria have significantly magnified the problems of prior art equalization techniques. For example, adjustments for these different remote stations in the past has required careful and critical line conditioning based on the use of a separate equalizer at each remote station transmitter. The aforementioned prior art adjustments discussed above, even with highly skilled operators, normally take an hour or more to satisfactorily equalize the line from each remote station to the central processor. Furthermore, since the bandwidth of the communication link is normally reserved totally for the data transmission operation from the remote station to the central processor, it is necessary to establish exterior communications such as by additional telephone lines in order to monitor the progress of the equalization and to advise the central processor that the remote station has properly equalized its transmission line to the central processor.

The foregoing techniques of the prior art thus tie up expensive equipment, costly communication links, and additional telephone lines merely for the purpose of trying to place the equipment in the condition for its intended use, namely, "data transmission." When it is considered that up to ten or more remote stations often communicate with one central processor, it is obvious that the equalization processes of the prior art are highly inefficient for employment in a system involving a centralized computer and a plurality of remote stations.

SUMMARY OF THE INVENTION

A data transmission system includes a central processor with a modem having a transmitter capable of communicating over an equalized transmission line with any given remote station from among a plurality of remote stations. Each remote station includes equipment for responding to a processor-initiated polling operation by returning data from the remote station to the central processor. Since the processor-to-remote station links, once equalized remain constant, one equalizer at each remote station can satisfactorily equalize for transmission from the central processor to any given one of the remote stations. The return or remote-to-processor transmission link in contradistinction, involves wide variations in amplitude and delay characteristics from one remote station to the next. It is highly advantageous in accordance with the principles of this invention, to employ a plurality of equalizing channels located in a line terminal unit that is connected at the central processor site between return lines from all remote stations and a common receiver. The line terminal unit contains as many equalizer channels as there are numbers of remote stations for the system. Also included in the line terminal unit is an address decoding device which recognizes a polling operation for any remote station and automatically connects the appropriate equalization channel as a terminating network for the transmission line from the addressed remote station to the common receiver at the central processor.

An additional feature of this invention includes selecting filters for both directions of the transmission network so that each transmission path has a composite characteristic which is substantially a linear phase passband. The passband width for the channels, in accordance with this feature, is defined as $1/T$ Hz. in cycles per second with a center frequency located at the carrier frequency to be transmitted over the line, said carrier frequency having a modulation period of T. By filtering in this manner, a signal transmitted to the central processor from a remote station over an unconditioned line is an analog signal distorted somewhat but still substantially having a peaked amplitude at the midpoint of a center modulation period and minimum amplitude at the midpoint of adjacent precedent and successive modulation periods as defined for the carrier frequency at the remote station. During equalization, the remote station emits a test signal having predetermined modulation periods squelched. An operator at the central processor can simply and rapidly adjust a plurality of resistors on that remote station's variable equalizer so as to obtain a succession of low readings on a NULL meter which monitors the amplitude received at predetermined sample periods for the test signals. The employment of the equalization scheme of this invention allows rapid equalization for every one of the remote stations. Thereafter, during data transmitting operations, the central processor polls various ones of the remote stations by sending out a polling address. The equalizer circuit assigned to each polled remote station is automatically connected at the line terminal unit of the central processor prior to the time allotted for receipt of a response from the polled station.

BRIEF DESCRIPTION OF THE DRAWING

The foregoing features and objects of this invention may be more fully appreciated by reference to the accompanying drawing in which.

DESCRIPTION OF THE PREFERRED EMBODIMENT

Figure 1:
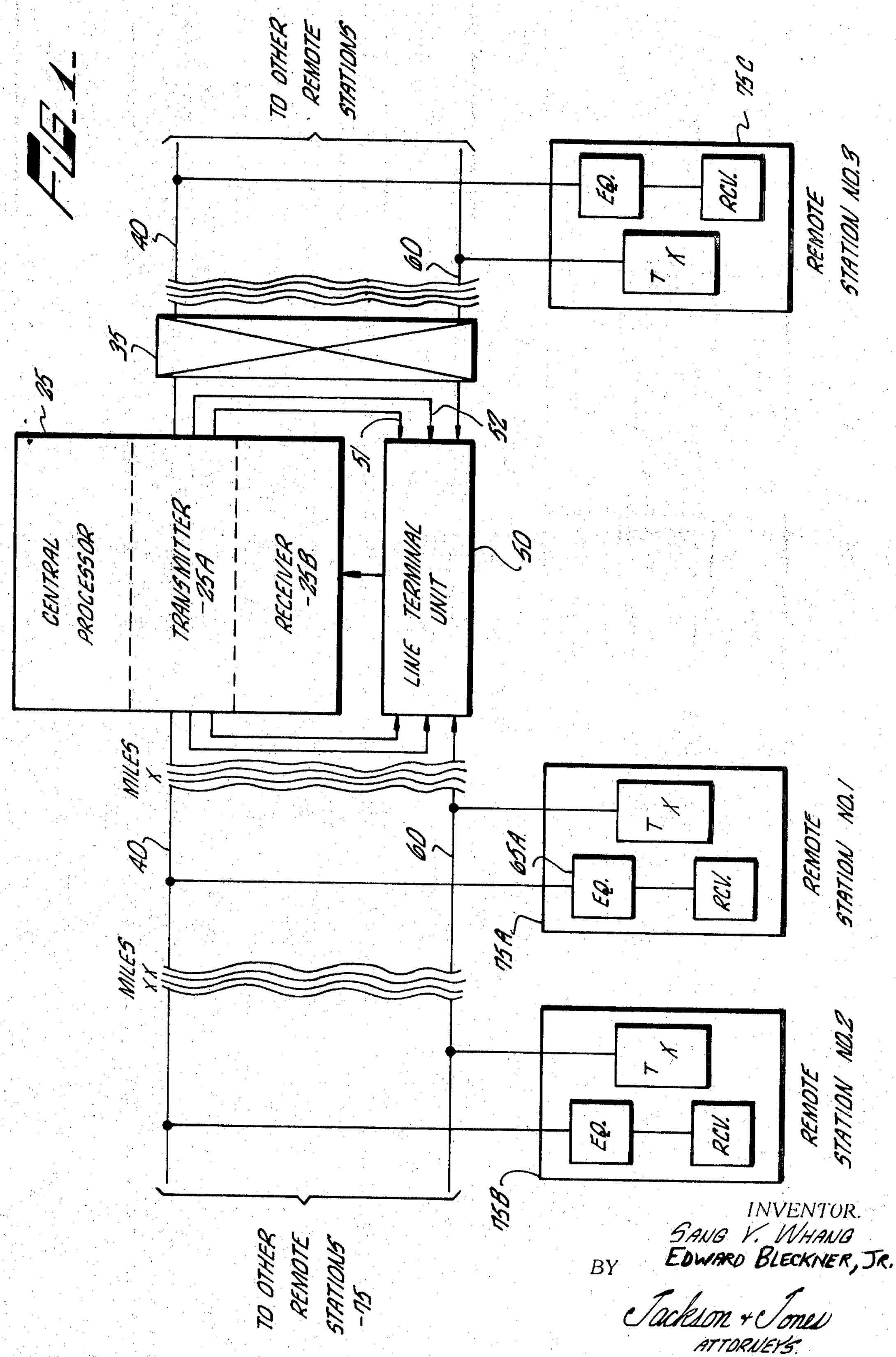
FIG. 1 is a block diagram of a central processor communicating with a plurality of remote stations, and including a line terminal unit in accordance with the principles of this invention.

Turning now to the drawing of FIG. 1, there is illustrated a central processor unit 25 which includes a modem having a transmitter 25A and a receiver 25B. A line terminal unit 50 is connected to the transmit and receive links 40 and 60. The central processor 25 communicates over a transmit link 40 with any one remote station at a time as selected from a plurality of remote stations 75. In FIG. 1 only three remote stations 75A, 75B and 75C are shown with the understanding that any number of remote stations may be polled in a given polling cycle assigned by control equipment in the central processor 25.

Each of the remote stations may be connected to the central processor through leased, or normal voice-grade telephone lines 40 and 60. These telephone lines may include leased lines. Such lines 40 and 60 may also include connections through one or more carrier links, shown symbolically as unit 35. As is well recognized, such telephone lines represent relatively poor amplitude and delay characteristics for data transmission through modems operating at high-bit rates in the order of 4800 to 9600 bits per second. Accordingly, such communication links require proper equalization for both directions of data transmission in order to achieve acceptable error rates. The manner of equalization for plural remote stations of this invention, is discussed in detail following a brief description of equalization between one transmitter and one receiver.

Typically, if central processor 25 is assumed to communicate with one remote station only, then both the remote station and the central processor include a data transmission modem (modulator/demodulator). Reference to the above mentioned patent application describes a variable equalizer system which is particularly useful for equalizing a two-way data transmission link for such operations. In such an instance, a variable equalizer 65A would be provided at the remote station 75A identified as remote station No. 1, in FIG. 1. This variable equalizer 65A may be of the type described and claimed in the foregoing mentioned patent application. Since the two-way transmission from the central processor 25 and a remote station 75A is always carried on over the same transmit and receive network, it is only necessary to equalize the transmit and receive terminals at either the remote station or at the central processor. Suitable transmission can thereafter occur, unless a new transmit and receive network were established (as through a different leased or dialed-up line) and then another equalizing operation could simply and readily take place so that further suitable transmissions could occur.

As shown in FIG. 1, however, a different problem is presented when the various ones of the remote stations 75 are at different geographical locations from the central processor 25. Telephone lines 40 and 60 exhibit amplitude and delay characteristics which degenerate as the distances from the central processor to various ones of the remote stations increase. Not only do differences in distance cause line characteristic variations from one station to the next, but other factors also tend to alter the line characteristics. These other factors, for example, include the link's route through various carrier units, the number of terminal stations through which the line is passed, and the type wire and connectors employed. All such factors significantly contribute to a wide range of highly variable amplitude and delay characteristics for each individual remote station. These wide discrepancies for each one of a plurality of remote stations are quickly and simply compensated for by the equalizer system of our invention.

In a polling operation for a plurality of stations, the central processor 25 may poll each of the remote stations 75 in a predetermined polling sequence. This polling operation includes transmission of a data train including an address to all remote stations. The address is unique only to the station designated thereby. An addressed remote station responds to its unique address and transmits a poll acknowledgment signal back to the central processor. In those instances wherein the polled station has data to transmit to the central processor, it also sends its data to the processor. Thereafter, the central processor polls the next remote station in the addressing cycle as established at the central processor. It is obvious that this addressing sequence is only one typical polling technique which is suitable for employment with this invention. Other random or priority addressing techniques from the central processor are equally within the scope of this invention.

Since the amplitude and delay characteristics, as described above, vary from one geographic location of a remote station to the next, the electrical characteristics of the return lines to the central processor must be selectively varied to match proper line characteristics for each remote station. In accordance with our invention, a line terminal unit 50 monitors the data train emitted by the transmitter 25 via leads 51 and 52. The line terminal unit 50 is logically arranged to respond to particular polling and address signals in the data train. As such signals appear on lines 51 and 52, means in line terminal unit 50 decodes the polling and address signals, and automatically connects a preadjusted equalizer circuit assigned to the addressed station between the receiver line 60 and receiver 25B.

Figure 2:
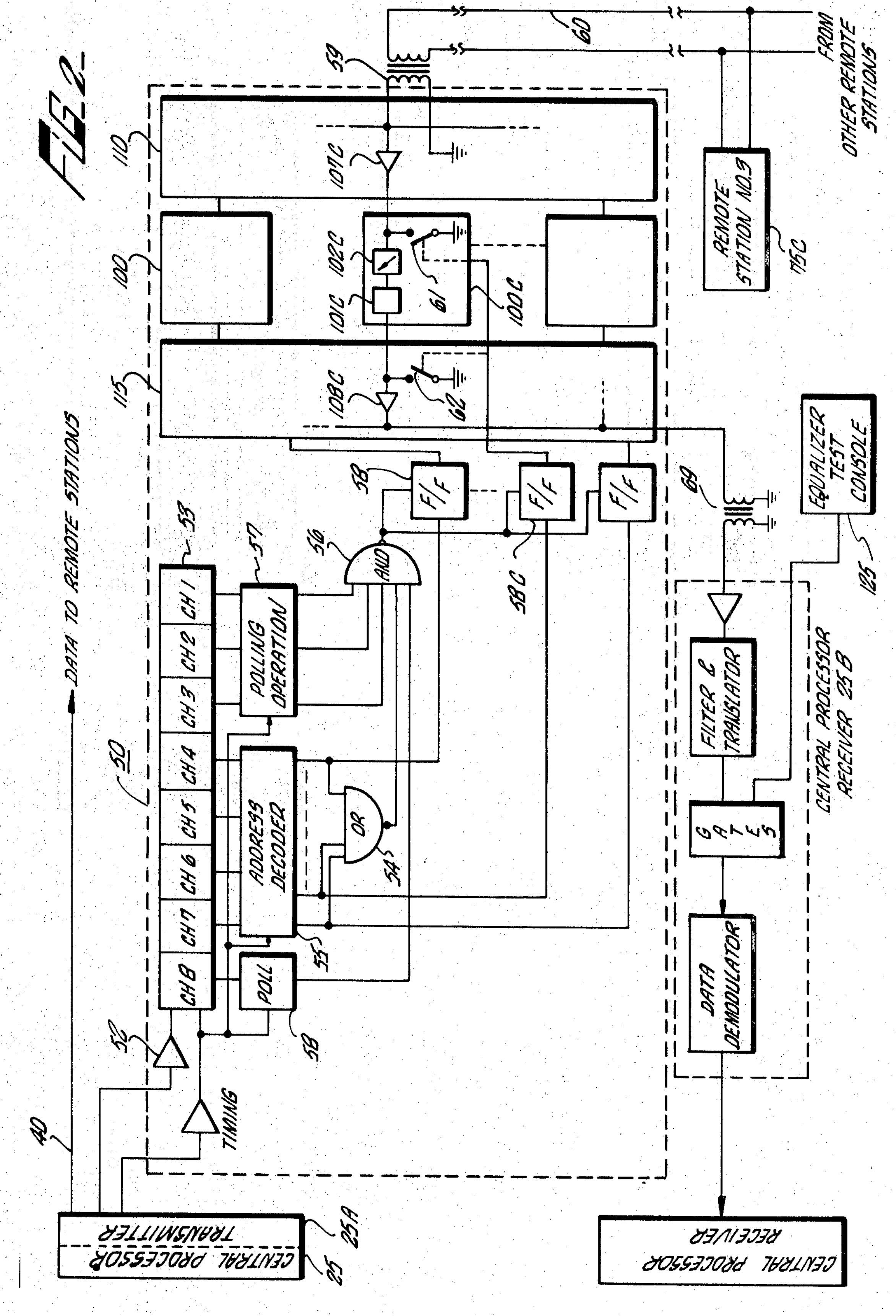
FIG. 2 is a combined block diagram and circuit schematic of certain components of FIG. 1 including the line terminal unit.

The above described polling and equalizing operation may more readily be understood by reference to the details of the line terminal unit 50 as shown in FIG. 2. In FIG. 2, the transmitter 25A and the central processor 25 of FIG. 1 are repeated. A polling address of any desired remote station first requires transmitter 25A, upon command of processor 25, to ready an appropriate data train. It is obvious that each given polling operation may differ from one central processor's mode of operation to the next. In at least one instance, however, a polling operation involves a data train including approximately sixty-four binary bits. These bits are divided into eight characters of eight bits per character. The sixty-four bit data train is temporarily stored in transmitter 25A while it is being readied for application in analog signal form to telephone line 40. Three bit signals may be serially grouped together for phase modulation and subsequent narrow band limiting prior to application to telephone line 40 as described in more detail in the foregoing referenced application and the applications referred to therein.

Digital signals from the sixty-four bit data train are monitored by lines 51 and 52 of FIGS. 1 and 2. Line 52 is a standard timing line while line 51 supplies bits to a shift register 53 in line terminal unit 50 shown in dashed lines in FIG. 2.

Shift register 53 may advantageously include sufficient stages for receiving the entire sixty-four bits associated with a polling operation. As a typical example, the first three characters (twenty-four bits), namely, characters CH1, CH2, and CH3 indicate that a polling sequence is taking place. These polling sequence characters are assigned a unique bit combination that is excluded from any random data sequences. These characters CH1 through CH3 thus indicate that the central processor 25 is polling all of the remote stations. The next four characters, namely, characters CH4, CH5, and CH7 received by shift register 53, may typically be formatted as another unique bit sequence that is reserved solely for addresses. Any one address in the sequence identifies one only of the remote stations. Thus, these four characters include a bit combination capable of addressing, for example, only remote station 75C from the plurality of remote stations 75. The final character CH8 is an equalizer command. When CH8 is received by the shift register 53 it indicates that the polling characters including the desired address characters, have been transmitted, and that the line terminal unit must equalize the return line 60 for the poll acknowledgment and data signals expected back from the addressed remote station 75C. Connected to the output lines from the stages of register 53 are a polling operation recorder 57, an address decoder 55, and an equalizer command decoder 58. These decoders may be any type as well known to the prior art which are responsive to the timing signals and to the bits stored in register 53 so as to emit output signals to logic gates 54 and 56. Decoder 57 will supply three true input signals to AND gate 56 when characters CH1, CH2, and CH3 are properly indicative of a polling operation.

Address decoder 55 emits a true output indication on one output lead only as associated with a particular remote station which has been addressed by the characters CH4 through CH7. Typically, logic gate 54 may be an OR gate which, as known to the prior art, is logically adapted to deliver a true, or enabling, signal of proper polarity to AND gate 56 when any valid address is decoded by decoder circuit 55. A polling-operation-complete, or equalize, decoder 58 is similarly adapted to respond to character CH8 by delivering another true signal to logic gate 56. Logic gate 56 is adapted to respond to true input signals from gate 54, from the polling-operation decoder 57, and from equalizer decoder 58, so as to emit a select command to a plurality of bistable devices 58.

The plurality of flip-flops 58 are also connected to the outputs from address decoder 55. One each of the plurality of flip-flops 58 are associated with a corresponding one of a plurality of equalizers 100. Each flip-flop 58 is normally in a state which guarantees that none of the equalizers 100 are connected between the central process receiver 25B (via signal transformers 59 and 69) and the various remote stations 75.

As described above, outputs from the address decoder 55 are individually applied to associated "set" leads of flip-flops 58 as well known in the prior art. An output indication on a given output lead of address decoder 55, sets its associated flip-flop 58 to which it is connected, provided that the logic requirements for AND gate 56 are concurrently satisfied. Enablement of any one of the flip-flops 58 in this manner changes its normal state. A change in the state of any flip-flop such as 58C, for example, in turn selects an equalizer such as 100C, by opening a switch pair for the equalizer assigned to the addressed remote station.

The plurality of equalizers 100 are connected in parallel in a ladder network which includes input and output exchanges 110 and 115, respectively. Located within the switch exchanges 110 and 115 are the necessary signal amplifiers, power supplies, and common signal connections for input and output lines so as to establish a completed path to receiver 25B for any addressed remote station.

In one embodiment of our invention, we have selected a normally grounded condition for both the input and the output terminals of every one of the equalizers 100 as an initial, or normal, condition. Thus, in the absence of any polling operation, all of the equalizers 100 are grounded through closed switches such as 61 and 62. Such grounded initial conditions avoid any loading of the lines and renders the system less susceptible to noise transients.

For a typical example, it is assumed that the initial state of flip-flop 58C has been changed, as just described. A change in state of flip-flop 58C selectively opens a pair of switches 61 and 62. Switch 61 may conveniently be located within the equalizer 100C and when opened serves to remove ground from both the output of a signal amplifier 107C and the input terminal of equalizer 100C. Switch 62 may conveniently be located in the output exchange 115, and when switch 62 is opened by flip-flop 58C it serves to remove ground from the output of the equalizer 100C and the input of signal amplifier 108C. Enablement of flip-flop 58C thus places the preadjusted equalizing characteristics of equalizer 100C in the transmission link between the signal transformers 59 and 69.

Equalizers 100 may, of course, be any equalization circuit well known to the prior art; however, we have obtained added advantages, described in more detail hereinafter, through the utilization of a common equalizer test console 125. Equalizers 100, each have a fixed amplitude and delay section such as section 101C for equalizer 100C and a variable amplitude and variable delay section (such as section 102C) as well.

Figure 3:
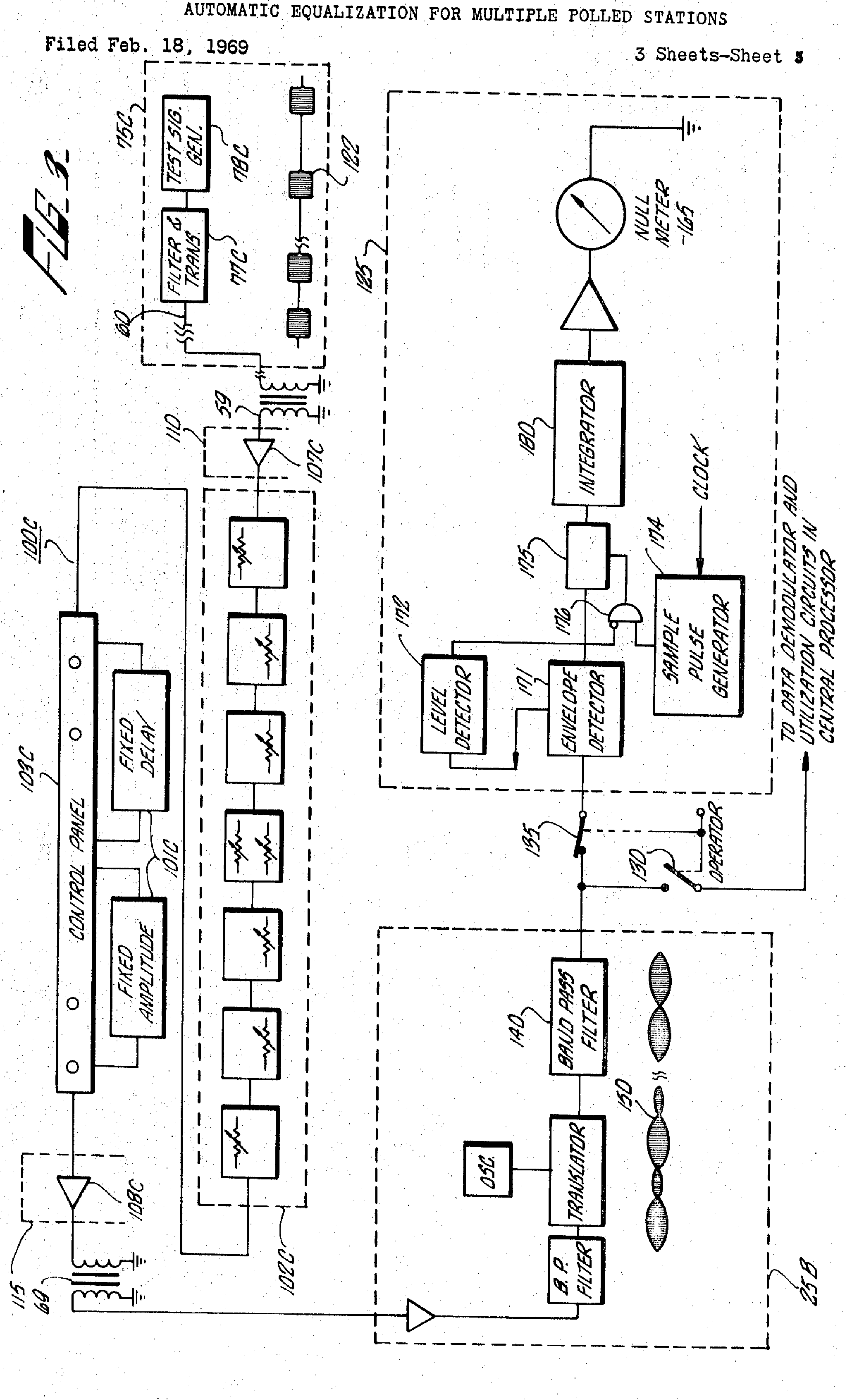
FIG. 3 is a block diagram of a variable equalizer, and an equalizer test console in accordance with the principles of this invention.

FIG. 3 depicts a preferred embodiment for the variable equalizers 100 of this invention and depicts in more detail the equalizer test console 125 shown in block form in FIG. 2. The general principles of an equalization operation and criteria for the modems employed in this invention are defined in considerable detail in the foregoing referenced patent application, and such detail need not be repeated in full herein. Briefly, the transmission links utilized in the data transmission system of this invention are band limited through a narrow bandwidth by the employment of bandpass filters having a passband width defined as $1/T$ Hz. where T is the modulation period, Hz. is in cycles per second, and the center frequency of the passband is at $f_o$, the carrier frequency of the modem. Filters for the communication link may be divided between the transmitter and the receiver locations or they may be located at one only of the two locations. In any event, however, such filters when taken in conjunction with the equalizer network, form a composite network which presents a linear phase and fixed amplitude over the narrow bandwidth utilized in this invention.

As is fully described in the referenced application, data is transmitted by modems at a relatively low carrier frequency over the transmission line proper, and upon reception it is translated up to a significantly higher frequency in order to obtain improved resolution through a significantly higher number of cycles present during each modulation period. A transmission link with the aforementioned filter characteristics will, in response to an amplitude modulated square wave test signal applied at its input, yield an output signal of substantially analog wave form which is peaked at the center of a modulation period corresponding to the transmitting modulation period, which signal drops toward zero at the midpoint of precedent and successive adjacent modulation periods at the receiver. Accordingly, this wave form, due to band limiting, is highly predictable for given test signals and, thus, provides a simple and direct test which may be performed at the equalizer test console 125, as described briefly hereinafter.

Reference to FIG. 3 discloses in block diagram form more details of the variable equalizer 100C of FIG. 2. Variable equalizer 100C includes a variable amplitude and variable delay section 102C, together with a fixed amplitude and a fixed delay section 101C, and an associated control panel 103C. It is assumed in FIG. 3 that switches 61 and 62 of FIG. 2 have been opened in response to a polling for remote station 75C in the manner described hereinbefore. Accordingly, the only equalizer which is operatively connected in the transmission network between exchanges 110 and 115 is equalizer network 100C.

Equalizer preadjustment for each one of the remote stations 75 is simple and rapidly obtained by an operator at the central processor contacting an operator at a remote station, such as 75C, by an external communication network or by unique preadjustment test signals transmitted by the central processor over the transmission links itself. In either event, the remote station 75C includes a signal generator 78C which generates a high frequency test signal 122 in the form of an amplitude modulated signal having various modulation periods squelched on adjacent sides of a modulation period containing a test signal. The output of the test signal generator 78C at remote station 75C is applied to a filter and translating network 77C which serves to translate the high frequency signal down to a low frequency carrier signal for transmission over the voice-grade telephone line 60. During the test, the operator at the central processor location opens a switch 130 and closes another switch 135 so as to connect the equalizer test console 125 directly to the output of a bandpass filter 140 located within the central processor receiver 25B. Receiver 25B also includes filters and translators for translating the low frequency carrier signal back to a higher frequency signal. Open switch 130 removes a connection from the bandpass filter 140 to a data demodulator which serves, during normal data transmission operation, to demodulate and decode the transmitted carrier signal for application to utilization circuits in the central processor.

During the preadjustment of equalizer 100C for remote station 75C, the operator throws switches on control panel 103C and observes the NULL meter 165. An operator first selects either a fixed amplitude section, a fixed delay section, both sections, or neither section, depending upon the lowest reading of NULL meter 165.

An envelope detector 171 is connected to a level detector 172 and has its signal output terminal connected to a signal transmission gate 175. A sample pulse generator 174 applies a gate enabling signal to logic gate 176 and if the input signal 150, at sample time, is of amplitude less than the threshold setting of detector 172 it is a valid sampling point, and a sample of a signal 150 is passed through gate 175 on to integrator 180 and NULL meter 165. These sample times are controlled by pulse generator 174 to be at expected low amplitude regions of received wave 150. Such samples are applied to NULL meter 165 as various resistors on the variable equilizer section 102C are adjusted by an operator. A series of adjustments allows the operator to select a succession of low NULL meter readings until the line is properly equalized. Thereafter, the remaining equalizers 100A, 100B, etc. assigned to the other remote stations 75A, 75B, etc. are preadjusted.

Once all preadjustments are completed, normally in a matter of a few minutes per station, the line terminal unit 50 will automatically select assigned equilizers for each station as polled by central processor 25. No further preadjustments are needed unless, of course, a telephone network or line to a remote station is altered. If so altered, the simple and rapid equalizer test of this invention allows equalization for the newly established amplitude and delay characteristics of the station's new link. The various operations in the apparatus and method of equalization for test console 125 of FIG. 3, including the unique characteristics of the test signals 122 and 150, are fully described in the above identified application and need not be described in more detail here.

The subject invention has been described with reference to certain preferred embodiments; it will be understood by those skilled in the art to which this invention pertains that the scope and spirit of the appended claims should not necessarily be limited to the embodiments described, as certain typical replacements and refinements have been mentioned hereinbefore.

What is claimed is:

1. A data transmission system comprising:

a central processor having a common receiver adapted to receive communications from any one of a plurality of remote stations;

station selecting means for establishing communication with selected ones of said plurality of remote stations;

line communication means from said remote stations to said common receiver, said line communication means representing different line characteristics from each remote station to said central processor;

a plurality of equalizers at said common receiver location, one each of said plurality being preadjusted to equalize the line characteristics of said line communication means for an associated one each of said plurality of remote stations; and switching control means at said processor automatically operative in response to said station selecting means for terminating said line communication means with the equalizer associated with a selected remote station.

2. A data transmission system in accordance with claim 1 wherein:

said communication means comprises a first signal coupling means having a receive terminal common to a plurality of said remote stations and an output terminal;

a first exchange circuit connected to said output terminal of said first signal coupling means and having a plurality of parallel outputs equal in number to the plurality of equalizers;

a second signal coupling means having a receive terminal and an output terminal connected to said central processor receiver;

a second exchange circuit also having a plurality of parallel input terminals connected in common to said receive terminal of said second signal coupling means; and means connecting one each of said plurality of equalizers respectively between an input and an output terminal of said second and said first exchanges with all equalizers of said plurality in parallel with each other.

3. A data transmission system in accordance with claim 2 wherein:

each of said equalizers further comprises switch means in said first and second exchanges normally operable for connecting an input and an output terminal of each equalizer to a common potential; and wherein said switching control means at said processor is connected to said switch means to remove said common potential from an input and an output terminal of an equalizer associated with a selected remote station.

4. A data transmission system in accordance with claim 1 wherein:

said line communication means is formed by a telephone line randomly selected from among a plurality of telephone lines each having signal transmission characteristics which vary widely from each other over their respective bandwidths and each of which have substantially matched amplitude and delay characteristics over a selected narrow bandwidth.

5. A data transmission system in accordance with claim 4 wherein:

all of the telephone lines exhibit, for said selected narrow bandwidth, an average amplitude and an average delay characteristic compensatable by a fixed filter network; and wherein:

each of said equalizers comprise a fixed amplitude and a fixed delay correction network selected to equalize said system for said average amplitude and said average delay line characteristics, respectively.

6. A data transmission system in accordance with claim 5 wherein each of said equalizers further comprise:

a variable equalizer section connectable to said fixed amplitude and said fixed delay correction networks, said variable section having a plurality of amplitude and delay networks variable by variable taps; and control means associated with each of said equalizers and operable to connect in series any desired combination of said fixed amplitude and/or said fixed delay sections to said variable equalizer section.

7. A data transmission system in accordance with claim 1 and further comprising:

a transmitting device at a remote station for generating a modulated test signal representative of the data signals to be transmitted;

signal blanking means at the transmitting device for transmitting a test signal during a center modulation period and for squelching the modulated test signal during preselected modulation periods including at least one precedent and one subsequent modulation period adjacent to said center modulation period;

means connecting said central processor through said line communciation means to said remote station for receiving said test signal, said received test signal having, when received over an equalized line communication means, a signal form including a maximum amplitude at the center modulation period and a signal form dropping toward a minimum amplitude at predetermined points of the precedent and subsequent squelched modulation periods adjacent to the center modulation period;

means in each of said equalizers to vary the amplitude and/or delay characteristics of said line communication means when said equalizer in connected thereto; and means at said processor common to more than one of said equalizers for measuring the amplitude of the received test signal at said predetermined points of said adjacent modulation periods whereby the one equalizer connected in the communication means may be varied to minimize the amplitude of the received test signals at said predetermined points.

8. A data transmission system in accordance with claim 7 wherein:

said processor includes a demodulator for data signals from said remote stations; and further comprising:

gating means operable during receipt of said test signals for isolating said data demodulator from receiving test signals transmitted over said line communication means.

9. A data transmission system in accordance with claim 7 wherein:

said transmitting device includes means for generating a carrier wave modulated with all digital data levels to be transmitted over said line communication means in each predetermined modulation period; and said system further comprises:

filter means in said line communication means and forming with said equalizer a composite filter network characterized as having a passband width of about $1/T$ Hz. and a center frequency of $f_0$; where:

T is the modulation period, $f_0$ is the carrier frequency, and

Hz. is cycles per second.

10. A data transmission system in accordance with claim 7 wherein:

said amplitude measuring means at said processor includes means for repetitively sampling amplitude at said predetermined points; and a null meter coupled to the sampling means and responsive thereto for indicating a minimum reading for optimum equalizer conditions.

11. A data transmission system in accordance with claim 10 wherein said repetitively sampling means additionally comprises:

an integrator circuit connected to receive said sampled amplitudes for supplying an integrated signal output to said null meter.

12. A data transmission system as defined in claim 11 wherein said repetitively sampling means further comprises:

level detecting means having a predetermined amplitude level; and signal inhibiting means connected to said detecting means for inhibiting transmission of sampled amplitudes to the integrator circuit when the amplitude of the received signal at said predetermined points exceeds said predetermined level of said level detecting means.

13. A data transmission system in accordance with claim 1 wherein said station selecting means comprises:

a control unit for addressing with a unique address signal any one of said plurality of remote stations; and address signal applying means connected between said central processor and said plurality of remote stations.

14. A data transmission system in accordance with claim 13 wherein said switching control means comprises:

monitoring means at said processor and connected to said control unit for storing said address signal identifying said remote stations;

decoding means connected to said address storing monitoring means; and logic means connected between said decoding means and said plurality of equalizers and responsive to a decoded output signal from the decoding means to terminate said line communication means with the one equalizer from said pluruality of equalizers which is preadjusted for the remote station addressed by said control unit.

15. A data transmission system in accordance with claim 14 wherein:

said address signal includes a first multibit group of signals uniquely identifying the address of a remote station to be selected, and a second multibit group of signals uniquely identifying a polling operation for all remote stations; and wherein:

said decoding means emits a plurality of output signals each indicative of an equalizer preadjusted for the remote station identified by said first group of multibit signals; and wherein:

said logic means is responsive to said address-indicating output only when said second multibit signal group is detected by said monitoring means.

16. A data transmission system in accordance with claim 15 wherein said monitoring means comprises:

a shift register for storing said first and second multibit signal groups.

17. A data transmission system in accordance with claim 16 wherein said decoding means comprises:

a first address decoder and a second polling decoder, each decoder adapted to respond with output signals only when respectively an address signal and a polling signal are stored in said shift register.

18. A data transmission system in accordance with claim 17 wherein said logic means comprises:

switching means for each equalizer set in a first operating condition to normally connect the associated equalizer to a source of common potential; said switching means being settable to a second operating condition in response to output signals from both of said decoding means for removing said ground potential from one only of said equalizers.

19. A data transmission system in accordance with claim 18 wherein said logic means comprises:

a plurality of bistable devices, one each of said plurality connected to switching means associated with one each of said equalizers, said bistable devices set normally in a first state for maintaining said switching means in said first operating condition, and settable to a second state for setting said switching means to said second operating condition;

means connecting the output of said address decoding means to a state controlling lead of one of said bistable devices; and means connecting the output of said polling decoding means to a common set lead for all of said bistable devices whereby any given bistable device selected by said address decoding means may be set in said second state by an output from said polling decoding means.

20. A data transmission system comprising:

a central processor including a central transmitter and a central receiver connected to a plurality of remote stations by send and receive links having amplitude and delay characteristics that vary from station to station relative to the central processor;

means at each remote station for equalizing the amplitude and delay characteristics for the send link from the central processor to each remote station;

a line terminal unit at the central processor connected between the receive link and the central processor receiver;

a plurality of equalizers in said line terminal unit, one each associated with and preadjusted for one each of said remote stations, for equalizing said receive link for each remote station to the central processor;

means at said central processor for selectively addressing over said send link any predetermined one of said plurality of remote stations; and means at said line terminal unit responsive to said addressing means for terminating the receive link with an equalizer associated with said addressed remote station prior to said station's answer to said processor over said receive link.

References Cited

UNITED STATES PATENTS

| | | | |
|---|---|---|---|
| 2,781,417 | 2/1957 | Bower | 333—18 |
| 2,876,283 | 3/1959 | Lundry | 179—150 |
| 3,321,719 | 5/1967 | Kaenel | 333—18 |
| 3,471,638 | 10/1969 | Groat | 325—65 |

ROBERT L. GRIFFIN, Primary Examiner

A. J. MAYER, Assistant Examiner

U.S. Cl. X.R.

325—42, 53; 179—16.5; 333—17, 18, 28